(12) United States Patent
Potier et al.

(10) Patent No.: US 11,697,490 B2
(45) Date of Patent: Jul. 11, 2023

(54) ACTUATION SYSTEMS FOR CONTROL SURFACES FOR AIRCRAFT

(71) Applicant: Goodrich Actuation Systems SAS, Saint Ouen l'Aumone (FR)

(72) Inventors: Karl Potier, Paris (FR); Arnauld Hervieux, Versailles (FR); Sebastien Vandevoir, Gennevilliers (FR)

(73) Assignee: GOODRICH ACTUATION SYSTEM SAS, Saint Ouen l'Aumone (FR)

( * ) Notice: Subject to any disclaimer, the term of this patent is extended or adjusted under 35 U.S.C. 154(b) by 0 days.

(21) Appl. No.: 17/574,835

(22) Filed: Jan. 13, 2022

(65) Prior Publication Data

US 2022/0227481 A1 Jul. 21, 2022

(30) Foreign Application Priority Data

Jan. 18, 2021 (EP) .................................. 21305049

(51) Int. Cl.
*B64C 13/40* (2006.01)
*B64C 9/16* (2006.01)
*B64C 9/08* (2006.01)
*B64C 13/28* (2006.01)
*B64C 13/42* (2006.01)

(52) U.S. Cl.
CPC ............... *B64C 13/40* (2013.01); *B64C 9/08* (2013.01); *B64C 9/16* (2013.01); *B64C 13/341* (2018.01); *B64C 13/42* (2013.01)

(58) Field of Classification Search
CPC ....... B64C 13/40; B64C 13/42; B64C 13/341; B64C 13/505; B64C 9/08; B64C 9/016
See application file for complete search history.

(56) References Cited

U.S. PATENT DOCUMENTS

| 3,756,089 | A | 9/1973 | Haladay |
| 9,284,039 | B2 | 3/2016 | Maenz |
| 9,586,675 | B2* | 3/2017 | Ungar ....................... B64C 9/00 |
| 2012/0312931 | A1 | 12/2012 | Recksek et al. |

(Continued)

FOREIGN PATENT DOCUMENTS

| CA | 2887220 A1 | 12/2015 |
| DE | 102010024121 A1 | 12/2011 |

(Continued)

OTHER PUBLICATIONS

Abstract for DE102010024121 (A1) 1 Page.
European Search Report for Application No. 21305049.5, dated Jun. 24, 2021, 9 pages.

*Primary Examiner* — Richard G Davis
(74) *Attorney, Agent, or Firm* — Cantor Colburn LLP

(57) ABSTRACT

An actuation system for a control surface for an aircraft includes a first, second, third and fourth actuator, a first and second bell crank, and at least one push pull rod system. Each of the first and second bell cranks comprises a first and a second crank arm, the first and second crank arms intersect with and are joined to each other at an intersection, the first and second crank arms extend from the intersection at an angle to each other, the first bell crank is pivotally connected to the sub-structure by a first pivot extending through the first bell crank's intersection, and the second bell crank is pivotally connected to the sub-structure by a second pivot extending through the second bell crank's intersection.

15 Claims, 2 Drawing Sheets

(56) References Cited

U.S. PATENT DOCUMENTS

2013/0320137 A1* 12/2013 Maenz ................ B64C 5/06
                                                       244/87
2021/0276694 A1* 9/2021 Bowers ............... B64C 13/341

FOREIGN PATENT DOCUMENTS

EP          3034393 B1   10/2018
WO       2012099300 A1    7/2012

* cited by examiner

ACTUATION SYSTEMS FOR CONTROL SURFACES FOR AIRCRAFT

CROSS-REFERENCE TO RELATED APPLICATIONS

This application claims priority to European Patent Application No. 21305049.5 filed Jan. 18, 2021, the entire contents of which is incorporated herein by reference.

TECHNICAL FIELD

This disclosure relates to control surfaces for aircraft which are in hinged connection with the aircraft's wings or stabilizers, and in particular, actuation systems for those control surfaces.

BACKGROUND

It is known that the design and innovation in the field of aircraft wings and stabilizers is leading to a decrease in thickness of those wings and stabilizers. Such a decrease leads to those wings and stabilizers having an increased efficiency. A consequence of the decrease in thickness is that there is a decreasing amount of space within the wings and stabilizers within which aircraft systems can be located. One such system is an actuation system for a control surface. Such systems will include at least an actuator and an associated hydraulic system, and are typically located in a void in the wing or stabilizer to which the control surface is hinged.

A known approach to limiting the space required for an actuation system for a control system is to arrange the actuator to act in a direction approximately parallel to the leading or trailing edge of the control surface, and to employ a bell crank or substantially L shaped lever and a push/pull rod to transmit movement/force from the actuator to the control surface. This arrangement keeps the actuation system close to the edge of the wing or stabilizer with the result that the void required to house the actuation system can be minimised.

SUMMARY

According to a first aspect of the present disclosure there is provided an actuation system for a control surface for an aircraft in which the aircraft comprises a wing or stabilizer to which a control surface is hinged, the wing or stabilizer comprises a sub-structure, and the control surface has a trailing edge, in which the actuation system comprises a first, second, third and fourth actuator, a first and second bell crank, and at least one push pull rod system, each of the first and second bell cranks comprises a first and a second crank arm, the first and second crank arms intersect with and are joined to each other at an intersection, the first and second crank arms extend from the intersection at an angle to each other, the first bell crank is pivotally connected to the sub-structure by a first pivot extending through the first bell crank's intersection, and the second bell crank is pivotally connected to the sub-structure by a second pivot extending through the second bell crank's intersection, the first and third actuators have first and second ends, the first ends of the first and third actuators are connected to the sub-structure, the second end of the first actuator is connected to the first crank arm of the first bell crank at a first connection position, the second end of the third actuator is connected to the first crank arm of the first bell crank at a third connection position, the second and fourth actuators have first and second ends, the first ends of the second and fourth actuators are connected to the sub-structure, the second end of the second actuator is connected to the first crank arm of the second bell crank at a second connection position, the second end of the fourth actuator is connected to the first crank arm of the second bell crank at a fourth connection position, and in the first bell crank the distance between the first connection position and the first pivot is greater than the distance between the third connection position and the first pivot, and in the second bell crank the distance between the second connection position and the second pivot is greater than the distance between the fourth connection position and the second pivot.

It is to be understood that all dimensions that are between connection positions and pivots referenced herein are, unless otherwise specified, dimensions between the geometric centres of the connection position and the pivot connecting the bell crank with the substructure.

In an embodiment of any of the above embodiments, the first and second crank arms and the intersection of a bell crank are all portions of a single continuous element that forms the bell crank. In such embodiments, the first crank arm is the portion of the bell crank that extends between the pivotal connection of the bell crank to the substructure and the connection of the bell crank with the second ends of the first and third or second and fourth actuators; and the second crank arm is the portion of the ball crank that extends between the pivotal connection of the bell crank to the substructure and the connection of the bell crank with a push pull rod system. The outside perimeter of the bell crank, in the plane in which the bell crank rotates may have, but not be limited to, a substantially L, J or triangular shape.

In an alternative embodiment of any of the above embodiments the first and second crank arms are separate arms that extend from the intersection with the first and second crank arms extending from the intersection in different directions.

In such embodiments, the first and second crank arms may be integral with each other (for example a single casting or single piece of material, or they may be connected to each other at the intersection using appropriate connection means. Appropriate connection means include, but are not limited to nuts and bolts, adhesive, or welding.

In an embodiment of the above embodiment, in the first bell crank the ratio of the distance between the first connection position and the first pivot and the distance between the third connection position and the first pivot is around 4:7; and in the second bell crank the ration of the distance between the second connection position and the second pivot and the distance between the fourth connection position and the second pivot is around 4:7. In an alternative embodiment, in the first bell crank the ratio of the distance between the first connection position and the first pivot and the distance between the third connection position and the first pivot is around 4:7; or in the second bell crank the ration of the distance between the second connection position and the second pivot and the distance between the fourth connection position and the second pivot is around 4:7.

The advantage of the different distances between the connection positions and the pivot on a bell crank is that the two actuators each have a different lever arm around the pivot connecting the bell crank and the sub-frame. This allows the actuators to be of different specifications and hence of different size and weight. The use of four actuators also has the advantage that the overall dimensions of each of the four actuators (especially the outer diameter of the actuators) is smaller than if only two actuators (one attached to each ball crank) were used.

In an embodiment of any of the above embodiments the second crank arms of the first and second bell cranks are each connected to a push pull system, and each push pull system is also connected to the control surface.

In some embodiments each push pull system comprises push pull rod, one end of the push pull rod is connected to the control surface and the other end is connected to a second crank arm.

In some alternative embodiments of the present disclosure there is only one push pull system to which the second crank arms of both of the first and second bell cranks are connected. In these embodiments the push pull system is adapted to translate the rotational movement of the second crank arms of the first and second bell cranks into a combined linear movement which can be transmitted to the connection between the push pull system and the control surface. In some embodiments the push pull system comprises at least one push pull rod, and one end of a push pull rod is connected to the control surface.

In an embodiment of any of the above embodiments at least one connection between the first ends of the first, second, third and fourth actuator and the sub-frame, and/or between the second ends of the first and third actuator and the first bell crank, and/or between the second ends of the second and fourth actuator and the second bell crank, and/or between the second crank arm of the first and second bell cranks and the push pull system, and/or between the push pull system and the control surface, is a connection which allows the connected elements to rotate relative to each other. This ability to rotate relative to each other allows the various elements to adjust their relative alignment as the bell cranks rotate. In some embodiments, the or each connection is a pivotal connection which allows one or both of the connected elements to rotate about the connection, for example a pin or shaft.

In an embodiment of any of the above embodiments the first bell crank is configured so that there is an angle of greater than 0 and less than 360 degrees between a line extending from the first connection position to the first pivot and a line extending from the third connection position to the first pivot; and the second bell crank is configured so that there is an angle of greater than 0 and less than 360 degrees between a line extending from the second connection position to the second pivot and a line extending from the fourth connection position to the second pivot. In an alternative embodiment of any of the above embodiments the first bell crank is configured so that there is an angle of greater than 0 and less than 360 degrees between a line extending from the first connection position to the first pivot and a line extending from the third connection position to the first pivot; or the second bell crank is configured so that there is an angle of greater than 0 and less than 360 degrees between a line extending from the second connection position to the second pivot and a line extending from the fourth connection position to the second pivot. It is to be understood that the lines between connection positions and pivots are between the geometric centres of the connection of the connection positions and the pivot.

In an embodiment of any of the above embodiments the angle between the lines is an included angle of greater than 0 degrees and less than 90, 80, 70, 60 or 45 degrees. The angle allows the actuators connected to a bell crank to have different orientations. The angle also allows movement of the second end of each actuator to be in a direction close to tangential to the arc swept out by the connection position for that actuator when the bell crank rotates around its pivot. This increases efficiency in the transmission of the movement/force from the actuators to the bell crank. The angle between the lines may also assist in preventing the actuators from colliding/interfering with each other as they reorientate when the bell crank is pivoting around its pivot.

In an embodiment of any of the above embodiments the first crank arm of one or both of the first and second bell cranks is comprised of a first and a second arm. This can lead to a lighter bell crank with the same mechanical characteristics than a bell crank where the first crank arm is solid and large enough to have connection positions with a desired angle between the above referenced lines.

In an embodiment of any of the above embodiments the first and third actuators are so orientated relative to the trailing edge of the control surface that the second ends of the first and third actuators move away from the first ends of those actuators in a direction which includes an element of movement in a first direction along the trailing edge of the control surface, and the second and fourth actuators are so orientated relative to the trailing edge of the control surface that the second ends of the second and fourth actuators move away from the first ends of those actuators in a direction which includes an element of movement in a direction along the trailing edge of the control surface which is opposite to the first direction along the trailing edge.

In an embodiment of any of the above embodiments the first and third actuators and the second and fourth actuators are so deployed that movement of the second ends of the first and third actuators away from their first ends is movement in substantially the opposite direction to movement of the second ends of the second and fourth actuators away from their first ends.

The above embodiments allow the first and second bell cranks to be located next to each other on the sub-frame and to be caused to rotate in opposite directions when the second ends of all of the actuators are moving in the same direction relative to their first ends, that is when the piston of each actuator is extending or retracting.

In an embodiment of any of the above embodiments the first and second actuators have the same specifications as each other, and the third and fourth actuators have the same specifications as each other. This allows the forces acting on the first and second bell cranks to be equal when the pistons of each actuator are all extending or all retracting.

In an embodiment of any of the above embodiments the stall load of each of the first and second actuators is greater than the stall load of each of the third and fourth actuators. In some embodiments the stall load of each of the third and fourth actuators is about half the stall load of each of the first and second actuators respectively.

In an embodiment of any of the above embodiments the first, second, third and fourth actuators are specified so that the stall load for each actuator is selected to produce the same surface stall hinge on the control surface for each actuator. The surface stall hinge and the stall load for an actuator are related by the gear ratio between the actuator and the surface.

In an embodiment of any of the above embodiments at least one of the first, second, third and fourth actuators is a hydraulic two way actuator.

In an embodiment of any of the above embodiments the actuator system further comprises first, second and third hydraulic manifold blocks, in which each of the first, second, third and fourth actuators are hydraulic two way actuators, the first actuator is in hydraulic communication with the first hydraulic manifold block, the second actuator is in hydraulic communication with the second hydraulic manifold block, and the third and fourth actuators are in hydraulic communication with the third hydraulic manifold block.

This configuration is desirable because it uses only three hydraulic manifold blocks rather than four to control four actuators. This configuration is advantageous because: it results in weight savings and a reduced number of parts; the use of three hydraulic manifolds (and thus the three hydraulic systems typically found in an aircraft) makes the actuation system safer and allows the aircraft not to use some safety features of the aircraft such as damping of the control surface; and the use of three hydraulic manifolds rather than two allows each hydraulic manifold to be thinner than if only two manifolds were used. A further advantages is that the load distribution between the first and second, and third and fourth actuators is uniform.

In an embodiment of any of the above embodiments the first, second and third hydraulic manifold blocks all have the same specification. This is advantageous because it limits the number of spare parts that need to be held in case of maintenance or breakdown of the actuator system of the present disclosure. This arrangement is possible because the arrangement of the third and fourth actuators having a connection position closer to the pivot of the bell crank than the first and second actuators allows the second ends of the third and fourth actuators to travel less distance and to travel more slowly than the second ends of the first and second actuators. Furthermore, because the third and fourth actuators have a smaller stall load than the first and second actuators, the outer diameter of the third and fourth actuators is smaller than that of the first and second actuators and thus the cross sectional area of the third and fourth actuators is smaller than that of the first and second actuators. All of these factors have the effect that the rate of flow of hydraulic fluid required for the third and fourth actuators is lower than that required for the first and second actuators. This allows the third hydraulic manifold to serve two actuators and remain of the same size and specification as the first and second hydraulic manifolds.

In an embodiment of any of the above embodiments the actuators of the actuation system are such that the first and second actuators each have an external diameter of 70 mm and a stall load of around 5000 Nm, and the third and fourth actuators each have an external diameter of 60 mm and a stall load of around 2500 Nm with the actuators having a nominal available hydraulic pressure of 4000 psi (27.579 MPa).

According to a second aspect of the present disclosure there is provided an aircraft comprising a control surface and a control surface actuation system according to the first aspect of the present disclosure.

BRIEF DESCRIPTION OF THE DRAWINGS

The present invention will be further described and explained by way of example with reference to the accompanying drawings in which.

DETAILED DESCRIPTION

Figure 1:
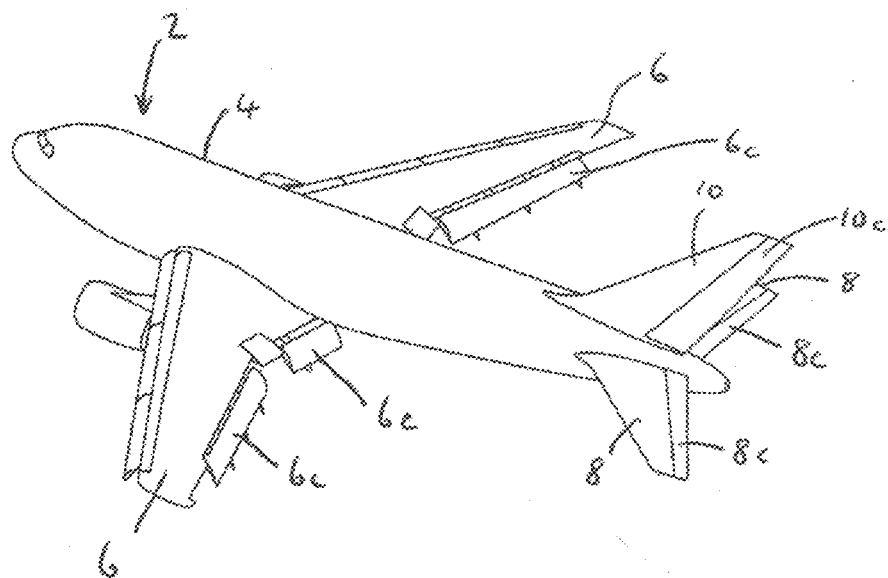
FIG. 1 shows an aircraft.

With reference to FIG. 1, an aircraft 2 has a fuselage 4, a pair of wings 6, a pair of horizontal stabilizers 8 and a vertical stabilizer 10. Each of the wings 6, horizontal stabilizers 8 and a vertical stabilizer 10 comprise at least one control surface 6c, 8c, and 10c respectively.

Figure 2:
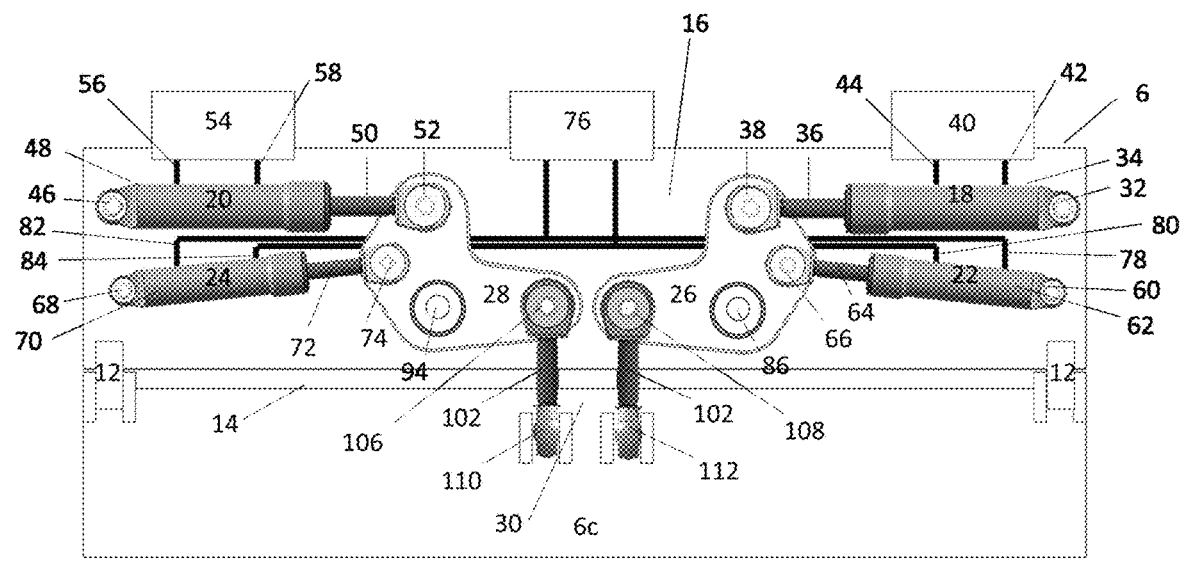
FIG. 2 shows a schematic representation of an embodiment of an actuation system according to the present disclosure.

With reference to FIG. 2, a schematic view of a control surface 6c is shown. The arrangement of FIG. 2 can equally be applied to control surfaces 8c and or 10c. A number of such arrangements may be present in any wing 6 or stabilizer 8, 10.

The control surface 6c is connected to a wing 6 via a pair of hinges 12. The hinges 12 have a common hinge line (not shown) which is substantially parallel to the control surface edge 14. The control surface 6c may rotate about that hinge line.

The wing 6 is comprised of an outer skin (not shown) and a sub-frame (not shown). Within the outer skin and mounted onto the sub-frame is an actuator system 16. The actuator system 16 includes first, second, third and fourth actuators 18, 20, 22 and 24, first and second bell cranks 26, 28, and a push pull system 30.

The first actuator 18 is a double acting hydraulic linear actuator with a rear mount 32 which is pivotally connected to the wing's sub-frame, a cylinder 34, and a piston 36 which is pivotally connected to the first bell crank 26 at a first connection position by a pivot 38. The first actuator 18 is powered from a hydraulic manifold block 40 via a first flow line 42 and a second flow line 44. The hydraulic manifold block 40 is in hydraulic communication with a first hydraulic system which includes a fluid reservoir and hydraulic pumps elsewhere in the aircraft (not shown).

The second actuator 20 is a double acting hydraulic linear actuator with a rear mount 46 which is pivotally connected to the wing's sub-frame, a cylinder 48, and a piston 50 which is pivotally connected to the second bell crank 28 at a second connection position by a pivot 52. The second actuator 20 is powered from a hydraulic manifold block 54 via a first flow line 56 and a second flow line 58. The hydraulic manifold block 54 is in hydraulic communication with a second hydraulic system which includes a fluid reservoir and hydraulic pumps elsewhere in the aircraft (not shown).

The third actuator 22 is a double acting hydraulic linear actuator with a rear mount 60 which is pivotally connected to the wing's sub-frame, a cylinder 62, and a piston 64 which is pivotally connected to the first bell crank 26 at a third connection position by a pivot 66.

The fourth actuator 24 is a double acting hydraulic linear actuator with a rear mount 68 which is pivotally connected to the wing's sub-frame, a cylinder 70, and a piston 72 which is pivotally connected to the second bell crank 28 at a fourth connection position by a pivot 74.

The third and fourth actuators 22, 24 are both powered from a hydraulic manifold block 76. The hydraulic manifold block has a first port which connects with the third and fourth actuators 22, 24 via first flow lines 78, 82 respectively, and a second port which connects with the third and fourth actuators 22, 24 via second flow lines 80, 84 respectively. The hydraulic manifold block 76 is in hydraulic communication with a third hydraulic system which includes a fluid reservoir and hydraulic pumps elsewhere in the aircraft (not shown).

Figure 3B:
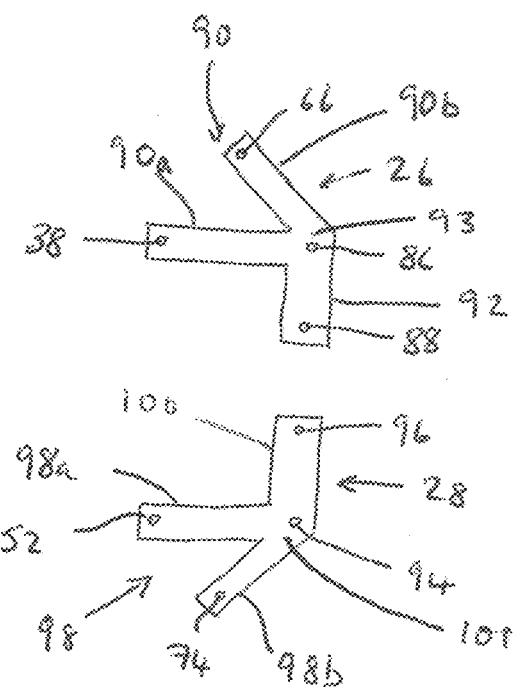
FIG. 3B shows a detail of an alternative actuation system according to the present disclosure.
Figure 3A:
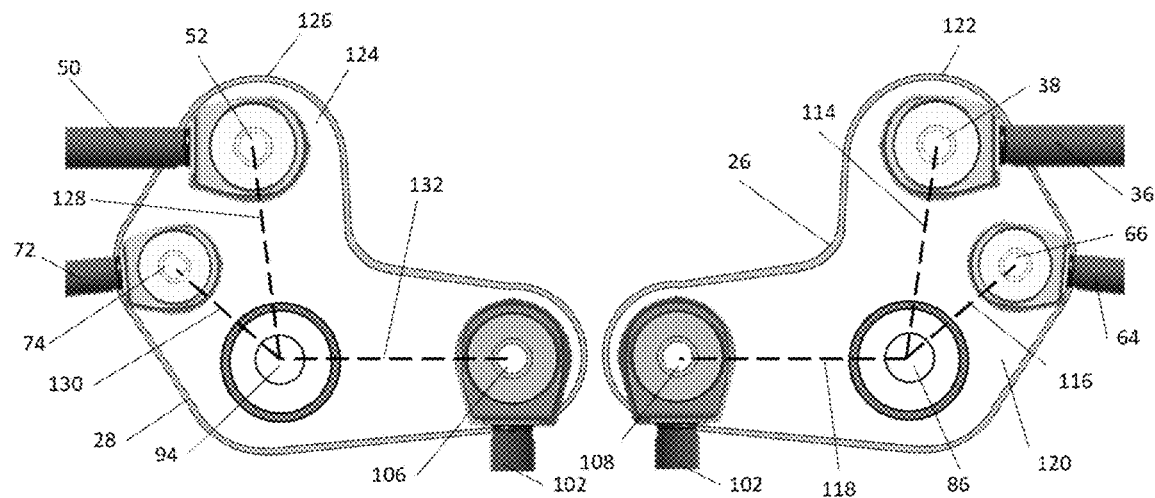
FIG. 3A shows a detail of the actuation system of FIG. 2.

With reference to FIG. 3A and with reference with FIG. 2, the first bell crank 26 is comprised of a plate of material 120 (in some examples the bell crank 26 may be a cast material, in some examples the bell crank 26 may be cut from a sheet of plate material). The outside shape or parameter of the plate 120 is configured to surround apertures for receiving pivots 86, 38, 66 and 108. The pivot 86 is connected to the sub-frame of the wing 6 and allows the bell crank 26 to rotate clockwise or anti-clockwise about pivot 86.

The apertures for pivots 38 and 66 are both spaced from the aperture for pivot 86 in the same general direction. The directions of pivots 38 and 66 from the pivot 86 are represented by dashed lines 114 for pivot 38 and 116 for pivot 66. The dashed lines 114 and 116 are rotationally separated by around 38 degrees. Pivot 38 is at a greater distance from pivot 86 than pivot 66.

The aperture for pivot 108 is spaced from the pivot 86 in the direction indicated by the dashed line 118. The angle between the direction of dashed line 118 and of dashed line 114 is around 110 degrees.

A flange 122 extends around the periphery of the plate 120. The flange 122 stiffens the plate 120.

The distance between the first connection position (the centre of pivot 38) and the centre of the pivot 86 is distance D1 and the distance between the third connection position (the centre of pivot 66) and the centre of the pivot 86 is distance D3. D1 is greater than D3. In some embodiments the ratio of D1 to D3 is around 4:7.

The second bell crank 28 is comprised of a plate of material 124 (in some examples the second bell crank 28 may be a cast material, in some examples the second bell crank 28 may be cut from a sheet of plate material). The outside shape or parameter of the plate 124 is configured to surround apertures for receiving pivots 94, 52, 74 and 106. The pivot 94 is connected to the sub-frame of the wing 6 and allows the bell crank 28 to rotate clockwise or anti-clockwise around the pivot 94.

The apertures for pivots 52 and 74 are both spaced from the aperture for pivot 94 in the same general direction. The directions are represented by dashed lines 126 for pivot 52 and 128 for pivot 74. The dashed lines 126 and 128 are rotationally separated by around 38 degrees. Pivot 52 is at a greater distance from pivot 94 than pivot 74.

The aperture for pivot 106 is spaced from the pivot 94 in the direction indicated by the dashed line 132. The angle between the direction of dashed line 132 and of dashed line 126 is around 110 degrees.

A flange 126 extends around the periphery of the plate 124. The flange 126 stiffens the plate 124.

The distance between the first connection position (the centre of pivot 52) and the centre of pivot 84 is distance D2 and the distance between the fourth connection position (the centre of pivot 96) and the centre of pivot 94 is distance D4. D2 is greater than D4. In some embodiments the ratio of D2 to D4 is around 4:7.

A push pull system 30 is pivotally attached to the second bell crank 28.

With reference to FIG. 3B and with further reference to FIG. 2 a second arrangement for the first and second bell cranks 26, 28 is shown. The first bell crank 26 is comprised of first and second arms 90, 92 which intersect at the intersection 93. The first arm 90 is comprised of arms 90*a* and 90*b* which mechanically effectively comprise a single arm 90. The pistons 36, 64 of the first and third actuators 18, 22 are fixed to arms 90*a*, 90*b* at the first and third connection positions via pivots 38, 66 respectively. The first bell crank 26 is pivotally connected to the wing's sub-frame via a pivot 86 which extends through the intersection 93. The distance between the first connection position (the centre of pivot 38) and the centre of the pivot 86 is distance D1 and the distance between the third connection position (the centre of pivot 66) and the centre of the pivot 86 is distance D3. D1 is greater than D3. In some embodiments the ratio of D1 to D3 is around 4:7.

The push pull system 30 is pivotally attached to the second arm 92 of the first bell crank 26 by pivot 88.

The second bell crank 28 is comprised of first and second arms 98, 100 which intersect at the intersection 101. The first arm 98 is comprised of arms 98*a* and 98*b* which mechanically effectively comprise a single arm 98. The pistons 50, 72 of the second and fourth actuators 20, 24 are fixed to arms 98*a*, 98*b* at the second and fourth connection positions via pivots 52, 74 respectively. The second bell crank 28 is pivotally connected to the wing's sub-frame via a pivot 94 which extends through the intersection 101. The distance between the second connection position (the centre of pivot 52) and the centre of the pivot 94 is distance D2 and the distance between the fourth connection position (the centre of pivot 74) and the centre of the pivot 94 is distance D4. D2 is greater than D4. In some embodiments the ratio of D2 to D4 is around 4:7.

The push pull system 30 is pivotally attached to the second arm 100 of the second bell crank 28 by pivot 96.

Each push pull system 30 is comprised of a push pull rod 102 which is pivotally connected to the first or second bell crank 26, 28. The push pull rod 102 extends between its connection to the first or second bell crank 26 or 28 via pivot 108 or 106 and a pivot 110 or 112 which connects the push pull rod 102 with the control surface 6*c*. The pivot 110 or 112 is located within the structure of control surface 6*c* in such a position that pushing or pulling the pivot 110 or 112 with the push pull rod 102 causes the control surface 6*c* to rotate about the hinge line of hinges 12.

Each of the connections between the actuators and the sub-frame, between the actuators and the bell cranks, between the push pull rods and the bell cranks, and between the push pull rod and the control surface are all pivotal connections. This allows a reorientation of those various elements relative to each other when the first and second bell cranks 26, 28 rotate relative to the sub-frame.

When the actuator system 16 is actuated so as to cause push pull rod 102 to push the pivot 110, a control system (not shown) causes hydraulic fluid to:

(i) pass from hydraulic manifold block 40 into the cylinder 34 of the first actuator 18 via first flow line 42 and from the cylinder 34 to the hydraulic manifold block 40 via the second flow line 44;

(ii) pass from hydraulic manifold block 54 into the cylinder 48 of the second actuator 20 via first flow line 56 and from the cylinder 48 to the hydraulic manifold block 54 via the second flow line 58;

(iii) pass from hydraulic manifold block 76 into the cylinder 62 of the third actuator 22 via first flow line 78 and from the cylinder 62 to the hydraulic manifold block 76 via the second flow line 80; and (iv) pass from hydraulic manifold block 76 into the cylinder 70 of the fourth actuator 24 via first flow line 82 and from the cylinder 70 to the hydraulic manifold block 76 via the second flow line 84.

This flow of hydraulic fluid causes:

(a) the pistons 36 and 64 of the first and third actuators 18, 22 to cause the first bell crank 26 to rotate in an anticlockwise direction (as seen in FIG. 2) around pivot 86; and (b) the pistons 50 and 72 of the second and fourth actuators 20, 24 to cause the second bell crank 28 to rotate in a clockwise direction (as seen in FIG. 2) around pivot 94.

The rotation of the first and second bell cranks 26, 28 causes the pivots 108 and 106 to move towards the control surface 6c and hence push pull rod 102 pushes pivot 110 or 112 causing control surface 6c to rotate about the hinges 12 in a first direction.

When the actuator system 16 is actuated so as to cause push pull rod 102 to pull the pivot 110, a control system (not shown) causes hydraulic fluid to:

(i) pass from hydraulic manifold block 40 into the cylinder 34 of the first actuator 18 via second flow line 44 and from the cylinder 34 to the hydraulic manifold block 40 via the first flow line 42;

(ii) pass from hydraulic manifold block 54 into the cylinder 48 of the second actuator 20 via second flow line 58 and from the cylinder 48 to the hydraulic manifold block 54 via the first flow line 56;

(iii) pass from hydraulic manifold block 76 into the cylinder 62 of the third actuator 22 via second flow line 80 and from the cylinder 62 to the hydraulic manifold block 76 via the first flow line 78; and (iv) pass from hydraulic manifold block 76 into the cylinder 70 of the fourth actuator 24 via second flow line 84 and from the cylinder 70 to the hydraulic manifold block 76 via the first flow line 82.

This flow of hydraulic fluid causes:

(a) the pistons 36 and 64 of the first and third actuators 18, 22 to cause the first bell crank 26 to rotate in a clockwise direction (as seen in FIG. 2) around pivot 86; and (b) the pistons 50 and 72 of the second and fourth actuators 20, 24 to cause the second bell crank 28 to rotate in an anticlockwise direction (as seen in FIG. 2) around pivot 94.

The rotation of the first and second bell cranks 26, 28 causes the pivots 108 and 106 to move away from control surface 6c causing push pull rod 102 to pull pivot 110 or 112 causing control surface 6c to rotate about the hinges 12 in a second direction opposite to the first direction.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the actuation systems disclosed in the various embodiments may be used alone, in combination, or in a variety of arrangements not specifically discussed in the embodiments described above. This disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. An actuation system for a control surface for an aircraft in which the aircraft comprises a wing or stabilizer to which a control surface is hinged, the wing or stabilizer comprises a sub-structure, and the control surface has a trailing edge, the actuation system comprising:
   first, second, third and fourth actuators;
   first and second bell cranks, wherein each of the first and second bell cranks comprises:
   a first and a second crank arm, wherein:
      the first and second crank arms intersect with and are joined to each other at an intersection;
      the first and second crank arms extend from the intersection at an angle to each other, the first bell crank is pivotally connected to the sub-structure by a first pivot extending through the first bell crank's intersection; and
      the second bell crank is pivotally connected to the sub-structure by a second pivot extending through the second bell crank's intersection; and
   at least one push pull rod system;
   wherein:
   the first and third actuators have first and second ends;
   the first ends of the first and third actuators are connected to the sub-structure;
   the second end of the first actuator is connected to the first crank arm of the first bell crank at a first connection position;
   the second end of the third actuator is connected to the first crank arm of the first bell crank at a third connection position;
   the second and fourth actuators have first and second ends;
   the first ends of the second and fourth actuators are connected to the sub-structure;
   the second end of the second actuator is connected to the first crank arm of the second bell crank at a second connection position;
   the second end of the fourth actuator is connected to the first crank arm of the second bell crank at a fourth connection position; and
   in the first bell crank a distance (D1) between the first connection position and the first pivot is greater than a distance (D3) between the third connection position and the first pivot, and in the second bell crank a distance (D2) between the second connection position and the second pivot is greater than a distance (D4) between the fourth connection position and the second pivot.

2. An actuation system according to claim 1 in which one or both of:
   in the first bell crank the ratio of the distance (D1) between the first connection position and the first pivot and the distance (D3) between the third connection position and the first pivot is around 4:7; and
   in the second bell crank the ration of the distance (D2) between the second connection position and the second pivot and the distance (D4) between the fourth connection position and the second pivot is around 4:7.

3. An actuation system according to claim 1, wherein the second crank arms of the first and second bell cranks are each connected to a push pull system, and each push pull system is also connected to the control surface.

4. An actuation system according to claim 3, wherein the push pull system comprises a push pull rod, one end of the push pull rod is connected to the control surface and the other end is connected to a second crank arm.

5. An actuation system according to claim 1, wherein at least one connection between the first ends of the first, second, third and fourth actuator and the sub-frame, or between the second ends of the first and third actuator and the first bell crank, or between the second ends of the second and fourth actuator and the second bell crank, or between the second crank arm of the first bell crank and the push pull system connected thereto or the second bell crank and the push pull system connected thereto, or between the or each push pull system and the control surface, is a connection which allows the connected elements to rotate relative to each other.

6. An actuation system according to claim 1, wherein one or both of:
   the first bell crank is configured so that there is an angle of greater than 0 and less than 360 degrees between a line extending from the first connection position to the first pivot and a line extending from the third connection position to the first pivot; and
   the second bell crank is configured so that there is an angle of greater than 0 and less than 360 degrees between a line extending from the second connection position to the second pivot and a line extending from the fourth connection position to the second pivot.

7. An actuation system according to claim 6, wherein the first crank arm of one or both of the first and second bell cranks is comprised of a first and a second arm.

8. An actuation system according to claim 1, wherein:
   the first and third actuators are so orientated relative to the trailing edge of the control surface that the second ends of the first and third actuators move away from the first ends of the first and third actuators in a direction which includes an element of movement in a first direction along the trailing edge of the control surface; and
   the second and fourth actuators are so orientated relative to the trailing edge of the control surface that the second ends of the second and fourth actuators move away from the first ends of the second and fourth actuators in a direction which includes an element of movement in a direction along the trailing edge of the control surface which is opposite to the first direction along the trailing edge.

9. An actuation system according to claim 1, wherein the first and second actuators have the same specifications as each other, and the third and fourth actuators have the same specifications as each other.

10. An actuation system according to claim 1, wherein a stall load of each of the first and second actuators is greater than the stall load of each of the third and fourth actuators.

11. An actuation system according to claim 1, wherein at least one of the first, second, third and fourth actuators is a hydraulic two way actuator.

12. An actuation system according to claim 11, further comprising:
   first, second and third hydraulic manifold blocks;
   wherein each of the first, second, third and fourth actuators are hydraulic two way actuators, the first actuator is in hydraulic communication with the first hydraulic manifold block, the second actuator is in hydraulic communication with the second hydraulic manifold block, and the third and fourth actuators are in hydraulic communication with the third hydraulic manifold block.

13. An actuation system according to claim 12, wherein the first, second and third hydraulic manifold blocks all have the same specification.

14. An actuation system according to claim 1, wherein the actuation system produces a surface stall load of at least 9500 Nm.

15. A wing or stabilizer for an aircraft comprising:
   a control surface; and
   a control surface actuation system according to claim 1.

* * * * *